(12) United States Patent
Chapman

(10) Patent No.: US 6,580,723 B1
(45) Date of Patent: Jun. 17, 2003

(54) TIME SLOTTED LOGICAL RING

(75) Inventor: John T. Chapman, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/184,758

(22) Filed: Nov. 2, 1998

(51) Int. Cl.[7] .............................................. H04B 7/216
(52) U.S. Cl. ...................................... 370/442; 370/403
(58) Field of Search ................................. 370/442, 401, 370/402, 403, 404, 405, 407, 408, 409, 389, 395, 351, 352, 400, 347, 345, 341, 337, 321, 468, 458, 459, 460, 452, 395.41, 395.4, 395.42, 503, 510, 399, 411–418, 465; 375/222; 348/469, 461, 441, 14.01, 14.11

(56) References Cited

U.S. PATENT DOCUMENTS

| | | | |
|---|---|---|---|
| 4,769,810 A | 9/1988 | Eckberg, Jr. et al. | |
| 4,769,811 A | 9/1988 | Eckberg, Jr. et al. | |
| 4,922,486 A | 5/1990 | Lidinsky et al. | |
| 5,327,421 A | 7/1994 | Hiller et al. | |
| 5,345,445 A | 9/1994 | Hiller et al. | |
| 5,345,446 A | 9/1994 | Hiller et al. | |
| 5,365,524 A | 11/1994 | Hiller et al. | |
| 5,390,175 A | 2/1995 | Hiller et al. | |
| 6,292,651 B1 * | 9/2001 | Dapper et al. | .............. 370/342 |

* cited by examiner

Primary Examiner—Dang Ton
(74) Attorney, Agent, or Firm—Marger Johnson & McCollom, PC

(57) ABSTRACT

A Time Slotted Logical Ring protocol manages the flow of traffic in a duplex media including a cable distribution network with a head end, a local node, and a group of subscribers. The subscriber includes a cable modem which produces an HDLC serial interface which then goes to the subscriber or gets converted to ethernet by a router and then to the subscriber. The Time Slot portion of TSLR protocol manages upstream and downstream access and uses time tick identification frames in the downstream direction to control upstream traffic. A multiple logical ring protocol in TSLR is used to allocate cable bandwidth between the multiple subscribers.

48 Claims, 10 Drawing Sheets

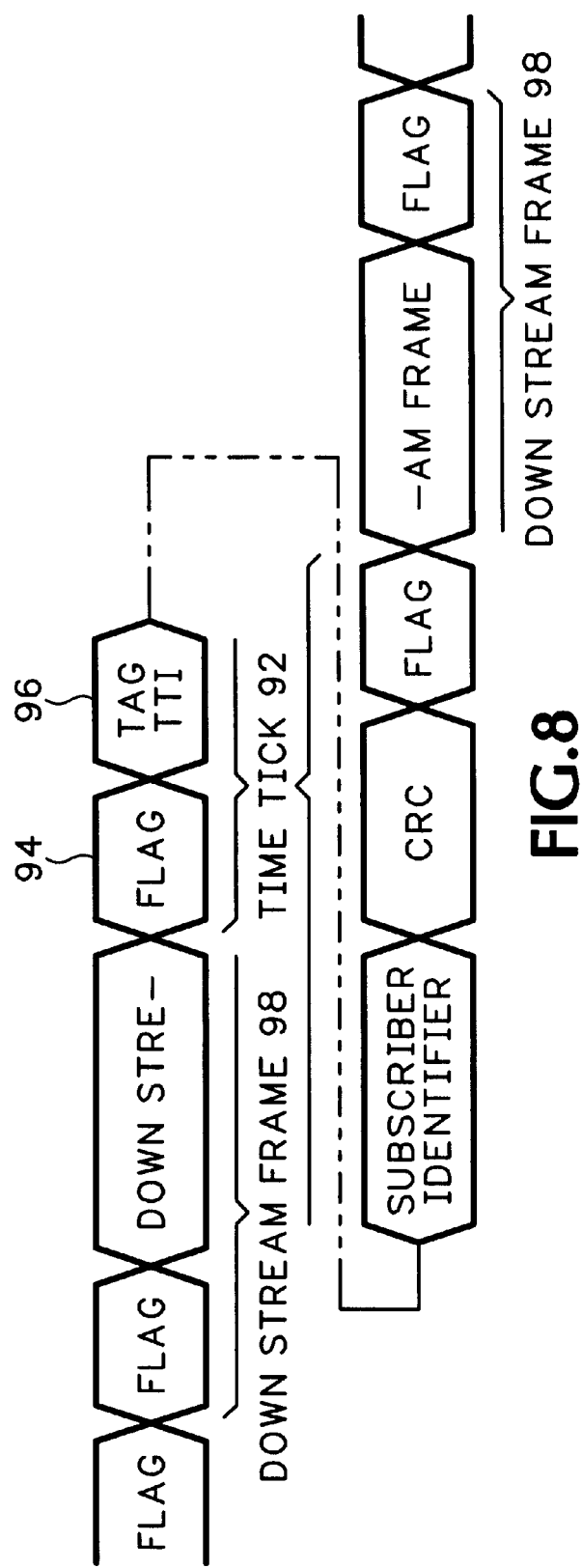
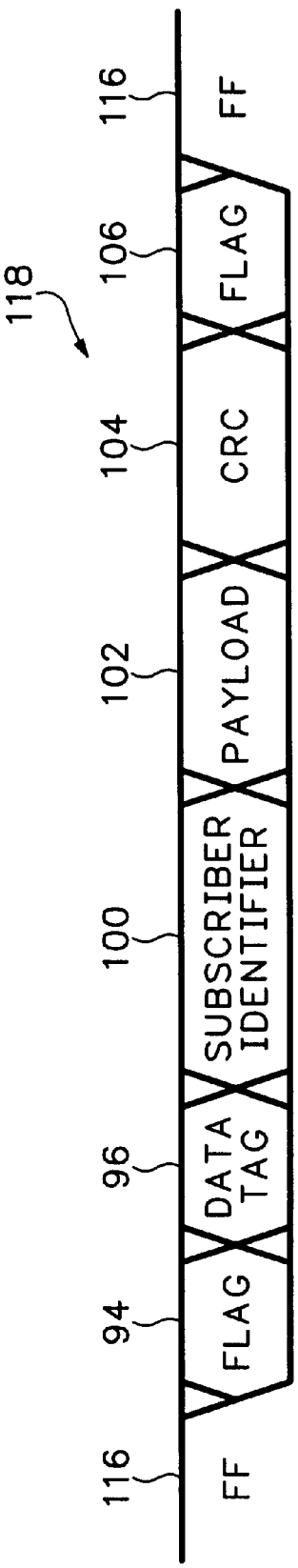
FIG.8
FIG.9

TAG BYTE BIT POSITIONS

| 7 | 6 | 5 | 4 | 3 | 2 | 1 | 0 |

| BIT | NAME | VALUE | DESCRIPTION |
|---|---|---|---|
| 7 | Dir | 0=down<br>1=up | DIRECTION BIT: This bit identifies the packet as an up stream or down stream packet. This bit is used with the ID bit, and is also useful for network diagnostics. |
| 6 | ID | 0=data<br>1=tti/hb | IDENTIFICATION BIT: A 0 indicates a data packet. A 1 in a down stream packet is a TTI. A 1 in an up stream packet is a Heart Beat packet. |
| 5 | FA | 0=last frame<br>1=middle frame | FRAME AGGREGATION BIT: Used in the up stream direction. A 0 means a single frame is being sent. A 1 means that there is another frame that will be sent immediately following the current frame. The Head End cannot reclaim the TTI until it receives a frame with this bit set to a 0. |
| 4 | XB | 0=short<br>1=long | EXPANSION BIT: A 0 indicates this is a simple TTI or a simple Heart Beat. A 1 indicates that there is a payload. A 1 would be used when the network would be running in a diagnostics mode. |
| 3 | D1 | D1, D0<br>00=normal<br>01=null<br>10=loop req<br>11=loop ack | DIAGNOSTIC BITS:<br>Normal: No special action required.<br>Null: This frame is to be ignored.<br>Loop Req/Ack: A loop back request is sent by one end, typically the head end. The far end then sets the loop back acknowledgment and returns the rest of the frame without modification. |
| 2 | D0 | | |
| 1 | | reserved | |
| 0 | | reserved | |

TAG BYTE VALUES

FIG.11

TIME SLOTTED LOGICAL RING

BACKGROUND OF THE INVENTION

A cable modem network includes a head end located at a cable company central location. The head end distributes cable services to different local areas of subscribers. Subscriber stations are terminated by cable modem boxes that are connected to the subscriber's computer through a conventional data interface such as serial or Ethernet. The cable modem boxes allow the subscribers to transmit data back upstream on the cable network to the head end. For example, if a subscriber wishes to order a pay-for-view movie, the subscriber enters a selection that is transmitted by the cable modem back over the cable network to the head end. The head end then transmits a downstream signal to the subscriber with the selected movie.

With the installation of more subscribers on cable modem networks, it becomes more important to allocate bandwidth more efficiently on the cable return path. For example, different types of transmissions, such as voice traffic may require a higher priority than data traffic. Alternatively, certain subscribers may need to purchase more bandwidth or higher priority than other subscribers. Current cable modem systems do not efficiently allocate cable bandwidth over the return path.

Accordingly, a need remains for a cable access system that allows multiple users to both send and receive information in an orderly and efficient manner.

SUMMARY OF THE INVENTION

Communications between a head end and multiple subscribers on a cable network are scheduled using a Time Slotted Logical Ring protocol (TSLR). Data is broadcast from the head end to the subscribers over a downstream path of a broadcast media, such as a combination of a fiber optical link and coaxial cable. The TSLR protocol allocates bandwidth to subscribers on an upstream path of the broadcast media by assigning the subscribers to time slots on different logical ring levels. The time slots on a first ring level represent the total available bandwidth for the upstream path. The portion of the bandwidth allocated to one or more of the time slots on the first ring level are distributed between multiple time slots on lower ring levels that represent different user bandwidth requirements.

The TSLR protocol rotates selection of the time slots around the first ring level allowing the subscriber assigned to the selected time slot to transmit data upstream to the head end. When the selected time slot opportunity on the first ring level is allocated to a lower ring level, the TSLR protocol allows the subscriber assigned to the selected time slot on the lower ring level to transmit. The TSLR protocol then rotates assignment of another time slot on the lower ring level to the time slot on the first ring. Thus, each subsequently lower TSLR ring level allocates relatively smaller portions of upstream bandwidth to the subscribers.

The head end sends time tick identifier (TTI) frames to the subscribers assigned to the currently selected time slots. The TTI frames are used to notify the identified subscriber to transmit frames upstream back to the head end. After receiving the TTI frame, the subscriber sends back either a data frame or a heart beat frame to the head end. The heart beat frame is sent when the subscriber has no data to transmit or when transmitting a reduced sized data frame. The heartbeat frame is used by the head end to assign the subscriber to different ring levels. For example, subscribers sending only heartbeat frames back to the head end for a specified time period are assigned to lower frame levels than subscribers sending back data frames.

The subscribers are assigned to different ring levels and, in turn, sent TTI frames at different rates according to different scheduling criteria. In one embodiment of the invention as mentioned above, the subscribers are assigned to different ring levels according to the number of data frames sent back from the subscribers to the head end within specified time periods. The subscribers can also be assigned to classes. The TSLR then meters out a maximum number of TTI frames to individual subscribers within a fixed time period according to the assigned subscriber classes. The subscribers can also be allocated time-bandwidth credits. The credits allocated to each subscriber are reduced upon receiving TTI frames and TTI frames are no longer sent to subscribers with zero credits. The credits for the subscribers are then increased after selected time intervals.

Bandwidth efficiency is improved by releasing early TTI frames after the head end receives a subscriber heart beat frame. Efficiency is also improved by aggregating multiple subscriber data frames together and sending the aggregated frames all at one time to the head end. To prevent allocating too much bandwidth to low bit rate subscribers, the highest ring level assigned to individual subscribers is controlled according to a maximum transmission rate of the individual subscribers.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 8 is a diagram showing an interlaced downstream frame structure used in the Time Slotted Ring protocol.

FIG. 9 is a diagram showing an upstream frame structure used in the Time Slotted Ring protocol.

FIG. 11 is a table providing definitions for tag byte values used in the Time Slotted Ring protocol.

DETAILED DESCRIPTION

Figure 1:
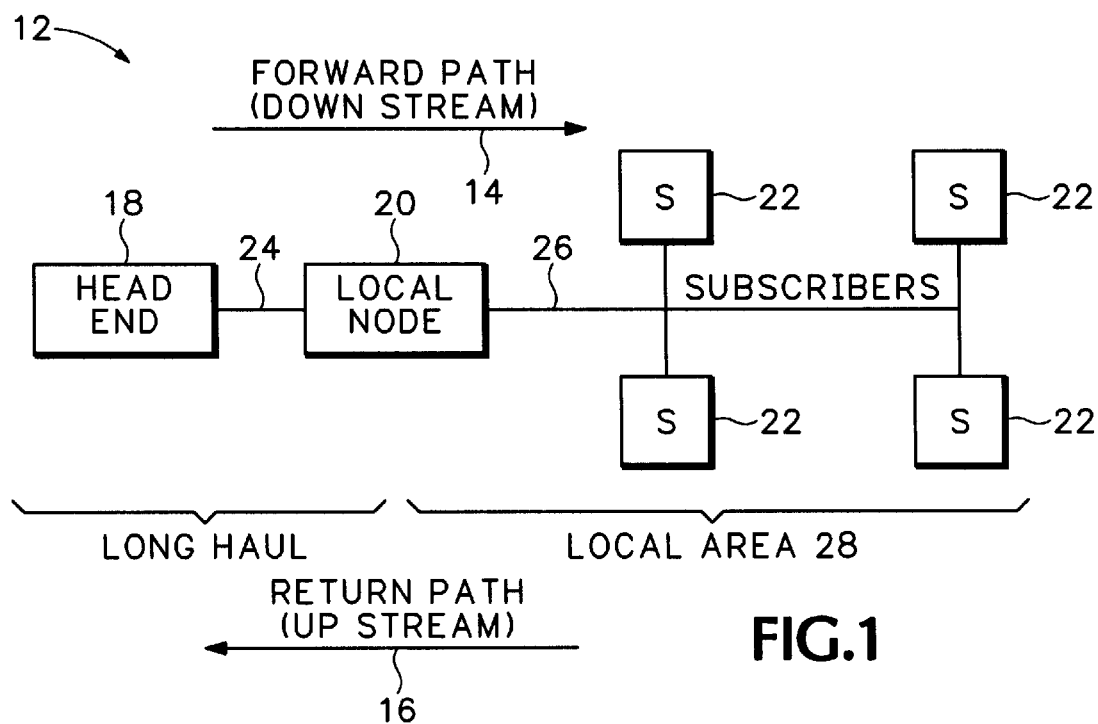
FIG. 1 is block diagram of a cable modem network.

FIG. 1 is a block diagram of a cable modem network 12. A broadcast media includes links 24 and 26 and exists in both a downstream direction 14 and an upstream direction 16. A head end 18 includes a computer data manager located at a cable company central location. In newer cable installations, the head end 18 connects first to a local node 20 over a long haul fiber optic link 24. The local node 20 then converts from the fiber optic link 24 to a coaxial cable 26 and distributes cable services to a local area 28 of subscribers 22.

In a dense residential area, the local node 20 might have 2 to 4 main coaxial cable (coax) runs 26 that support a total of 300 to 500 subscribers 22 (homes) within a 1 to 2 mile radius. Less dense areas have less homes and a larger radius. The long haul link 24 is typically between 0 to 13 miles. The head end 18 typically supports 40 local nodes 20. Each local node 20 has its own unique upstream path 16. Older cable wiring plants do not have local nodes 20 and drive main cable runs directly from the head end 18.

Figure 2:
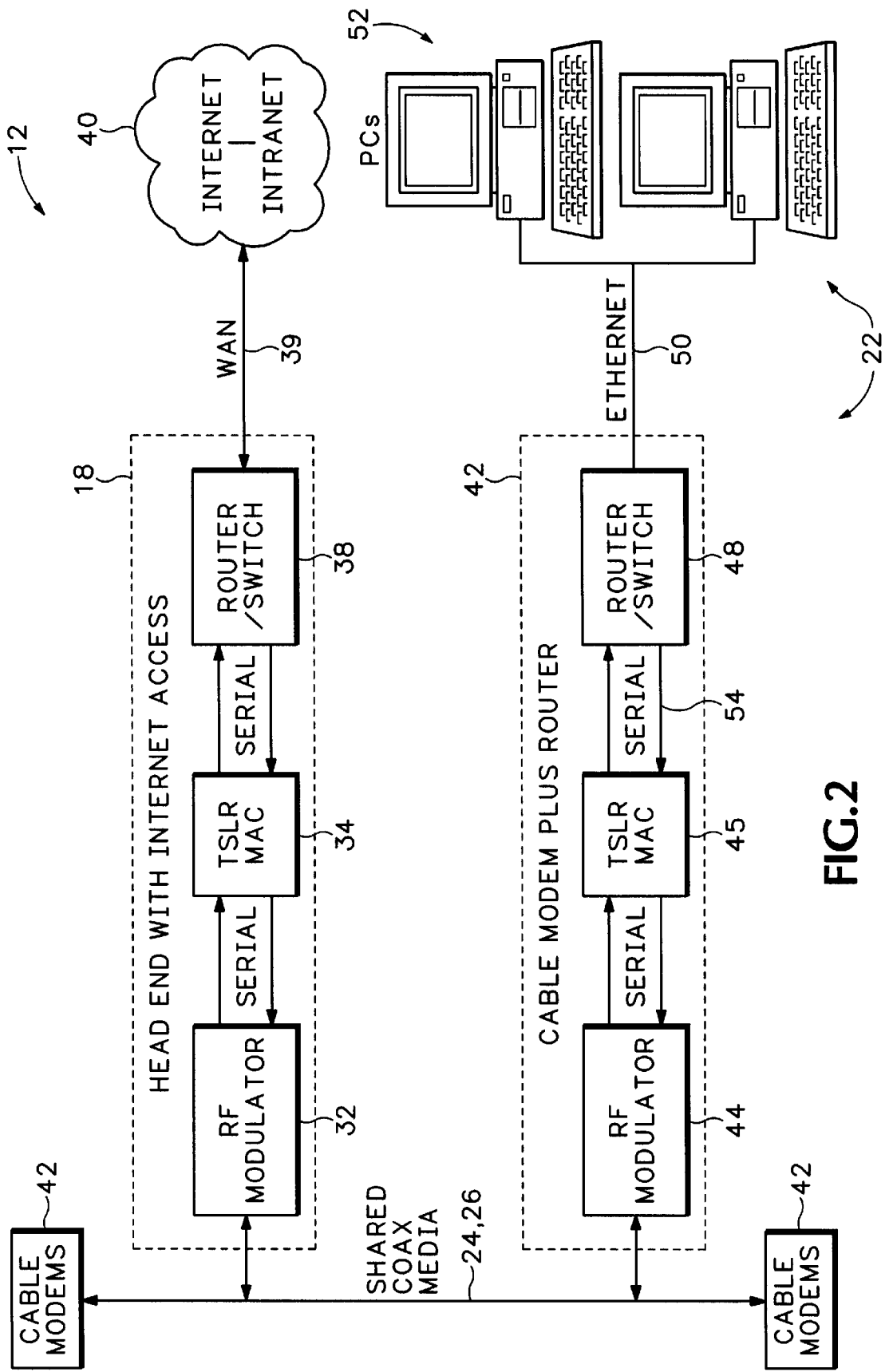
FIG. 2 is detailed diagram of a Time Slotted Logical Ring controller according to the invention used in the cable modem network shown in FIG. 1.

Referring to FIG. 2, the head end 18 connects to a local computer server or through a router 38 to the Internet or an internal data network known as an intranet 40. The subscribers 22 each include a cable modem box 42 connected to a computer 52 through a conventional data interface such as serial or Ethernet 50. At a home or small office/home office (SOHO), the personal computers (PCs) 52 are connected together so they can share the same high speed Internet service. A router or bridging/switching circuit 48 is commonly used to convert from Ethernet local area network (LAN) 50 to serial wide area network 54. On the analog side, RF modulators 32 and 44 provide the forward path 14 (downstream) and the return path 16 (upstream) between the head end 18 and the SOHO over the shared broadcast media 24, 26. On their digital side, the RF modulators 32 and 44 provide a standard synchronous serial interface that consists of bidirectional clock and data streams.

The head end 18 includes the central router 38 that connects to the local intranet, or out to a public internet 40 through a WAN connection 39 such as frame relay or asynchronous transfer mode (ATM). Data packets between the central router 38 and the subscriber's router 48 are placed in frames and transferred over the shared coax media 24,26. The cable plant between the head end 18 and the subscriber location 22 is too large for a carrier sense multiple access/collision detect (CSMA-CD) Ethernet like protocol to run efficiently. Therefore, Ethernet is used only as a local data interface at the head end 18 and at the subscribers 22.

An access and scheduling protocol known as Time Slotted Logical Ring (TSLR) is employed internal to the cable modem network 12 between the head end 18 and the subscribers 22. TSLR coordinates and ensures timely delivery of downstream and upstream traffic, prioritizes traffic, reallocates bandwidth for bursting, and efficiently shares access for all subscriber nodes. TSLR operates independently of data protocols like Ethernet or TCP/IP that TSLR transfers. A TSLR based system can, therefore, be expanded to support user interfaces other than ethernet, such as integrated services digital network (ISDN) for voice, or even ATM for mixed media.

An open system interconnection (OSI) layer 1 physical layer (PHY) consists of the RF modems 32 and 34 that provide a bidirectional media between the head end 18 to the cable modem 22. The PHY layer operates independently of the TSLR protocol. An OSI layer 2 media access control (MAC) layer is TSLR and consists of two parts. The first part is TSLR framing, and the second part is TSLR link management. An OSI layer 3 network layer is independent of TSLR and typically is internet protocol (IP) or point-to-point protocol (PPP). Layer 3 can also be an encapsulated Ethernet or ATM cells. An OSI layer 4 transport protocol is independent of TSLR and is typically transmission control protocol (TCP).

Data is managed in both the upstream and downstream directions. In both directions, there are several arbitration operations performed by the TSLR.

Access: Contention is resolved between multiple subscribers 22 who wish to gain access to the upstream bandwidth. A "Time Slot" portion of TSLR resolves contentions by performing all accesses at predetermined intervals that are coordinated by the head end 18.

Bandwidth Management: Bandwidth is managed so that subscribers 22 get faster response time and larger bandwidth usage upon demand. The "logical ring" portion of the TSLR manages bandwidth by classifying subscribers according to their traffic patterns, and gives heavy traffic subscribers faster access time, higher bandwidth, and hence lower latency.

The head end 18 manages all the access mechanisms for the Time Slotted Logical Ring. The local node 20 does not control access. However, all delay calculations are done with respect to the local area network 28 between the local node 26 and the subscribers 22 (FIG. 1). The head end 18 remotely manages the local network 28 of subscribers 22 that exist within the physical local node 20.

For upstream access 16, there is one homogenous media with one receiver and many potential transmitters. If more than one subscriber 22 transmits at a time, there will be a data collision, and data will be lost. The TSLR conducts deterministic access control to prevent collisions. The TSLR partitions bandwidth to all subscribers 22 to allow universal access, but can partition the majority of the bandwidth to one or more subscribers 22 who may be bursting large amounts of data for a short period of time. The TSLR dynamically adjusts the bandwidth allotment to different subscribers.

Figure 3:
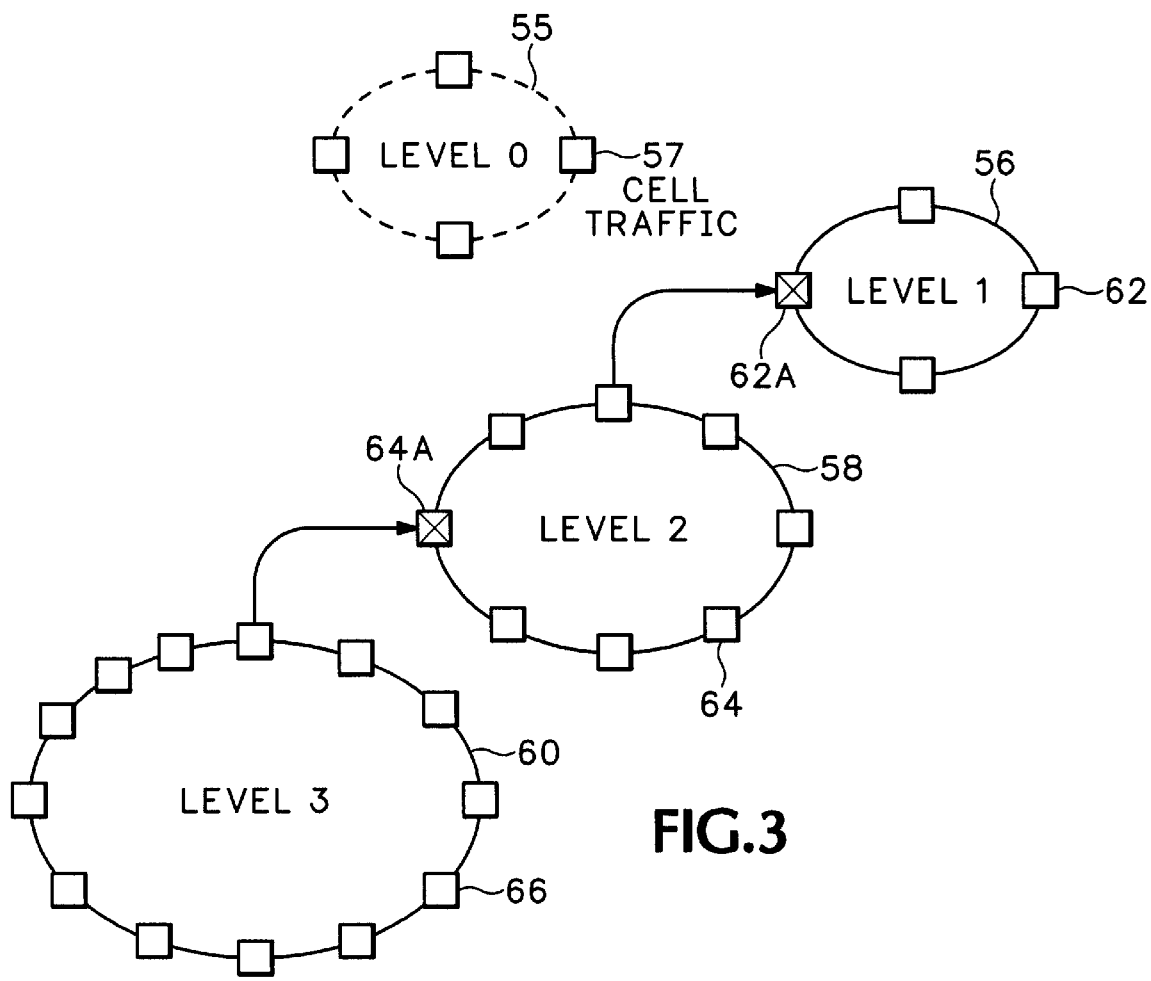
FIG. 3 is diagram of multiple ring levels used in the Time Slotted Ring protocol according to the invention.

Referring to FIG. 3, upstream bandwidth is divided up between all subscribers 22. As much bandwidth is made available as possible to any one subscriber 22 if no one else is using it, and access time to busy subscribers is minimized to keep the network latency low. To achieve this objective, the TSLR protocol classifies all subscribers 22 into a series of levels based upon their level of recent activity. Level 0 provides a constant bit rate. Level 1 is the highest level for multiple levels that have a variable bit rate.

A very basic TSLR protocol has only two ring levels 56 and 58: active and inactive. Active subscribers 22 are users who have transmitted data within a recent time period and are assigned time slots 62 on a first ring level 56. Any subscriber 22 who is not active is therefore inactive and is assigned a time slot 64 on a second ring level 58. The length of time that defines recent is known as the aging time and is a TSLR configuration parameter. The number of frames sent by a subscriber within the aging time (excluding heart beat frames) to qualify for active status is known as the aging frames and is a TSLR configuration parameter.

In one example, the level 1 aging parameter is one frame within a time period as small as 20 milliseconds, or as long as 30 minutes. In this example, the list of active subscribers 62 are placed on the level 1 TSLR 56. The inactive subscribers 22 are placed on the level 2 TSLR 58. The head end 18 sends a time tick identifier frame (TTI) notifying the subscriber it is now allowed to transmit. The TTI's are sent out to each subscriber 22 in level 1 in a logical sequence. If there were four current subscribers 22 assigned to the level 1 ring 56, each subscriber 22 receives permission to transmit every fourth time slot, effectively giving each subscriber 22 one quarter of the upstream bandwidth. The level 2 TSLR ring 58 has one or more of its subscribers receives permission to transmit once every rotation through the level 1

TSLR 56. The level 2 TSLR subscribers 22, as a group, shares one or more time slots 62A in the level 1 TSLR ring 56.

The number of subscribers from the level 2 TSLR ring 58 that are granted permission to transmit per rotation of the level 1 TSLR ring 56 is designated by a network configuration parameter, and is a percentage value known as lower ring access interval (LRAI). For example, say the LRAI for level 1 was 25%. Then one level 2 TTI is issued after every three level 1 TTI's. 75% of the network bandwidth is available to current and busy subscribers 62 on level 1, while 25% of the network bandwidth is shared by new subscribers 62 or by low bandwidth subscribers 62 assigned to level 2.

If there is only one subscriber in level 1, the one subscriber 22 receives three TTI's in a row. This optimizes the amount of bandwidth available to the subscriber 22 in a given burst interval. However, care is taken so that bandwidth is not lost. If the local cable television (CATV) upstream bandwidth (for example 10 million bits per second (Mbps) is greater than the interface bandwidth (for example 1 Mbps) of the subscriber 22, then the subscriber 22 is not issued subsequent TTI's since the TTI's could not be used. TTI Metering explained below prevents assigning too much bandwidth to individual subscribers 22.

At a more advanced level, the TSLR protocol runs more efficiently with more than 2 levels of TSLR rings. FIG. 3 also illustrates a third TSLR ring 60 having one of multiple time slots 66 assigned to slot 64A in TSLR ring 58. Note that only the head end 18 is aware of the scheduling constraints and level assignments. The subscribers 22 react only after receiving a TTI, and have no concept of ring levels. Thus, the head end 18 scheduling software may be updated or changed without changing software in the subscribers.

TSLR Applied to Constant Bit Rate Traffic

An example of constant bit rate traffic is voice. Voice traffic is generated and received at a rate of 8,000 bytes per second (Bps). Voice is typically sent over a shared media one byte at a time using a time slot mechanism. To transport voice over TSLR, the voice samples are gathered into small frames or cells. Doing this adds latency into the voice path, so cell sizes are kept as small as possible. For example, 48 bytes of voice is collected and then forwarded. At 8 kBps, the net latency added is: 48 bytes/8,000 bytes/sec=6 milliseconds. Once the voice is in a frame form, it is passed through the network in an asynchronous manner. However, the short frame size is wasteful on network bandwidth.

This inefficiency is solved by introducing a logical ring 55 at level 0. Only cell traffic 57 is allowed on ring level 0. As such, TTI's are very closely spaced and bandwidth is preserved. Ring level 0 is initiated and sequenced once every 6 milliseconds and preempts the level 1 through level 3 rings. The net effect is that level 0 becomes a synchronous ring and levels 1 through 3 become asynchronous rings. TTI early release and packet aggregation are not needed on the level 0 ring because all the frames are at their maximum frame size (for example, 48 bytes+overhead). Near 100% bandwidth efficiency is achieved.

Signaling frames for voice call set-up and tear-down is accommodated on either ring structure. If the voice signaling is contained in time division multiplexed (TDM) frames within the equipment connected at either external ends of the TSLR network, then the signaling information is embedded into the level 0 ring. If the signaling is frame based and originates from within the TSLR environment, the signaling frames are sent over the lower asynchronous rings.

ATM

Asynchronous transfer mode (ATM) converts all information into 53 bytes cells. ATM is handled in the same manner described above for voice. On a pure ATM network, the MTU for all the cable modems is set to 53 bytes and TTI frames are released based upon this frame length for all TSLR rings. As a result, frames appear back-to-back with very little wasted bandwidth.

Note that for both ATM and voice, the frame size is small and the time between time ticks is also small. The frame aggregation and early TTI release algorithms are not needed in this case. The level 0 ring runs efficiently because the head end 18 issues a sequence of TTI's without waiting for anything back from the subscribers 22, essentially pipelining the TTI's. The only network delay that must be accommodated is the delay within the local node tree structure 26. In effect, the head end 18 is remotely managing a local network.

Figure 4:
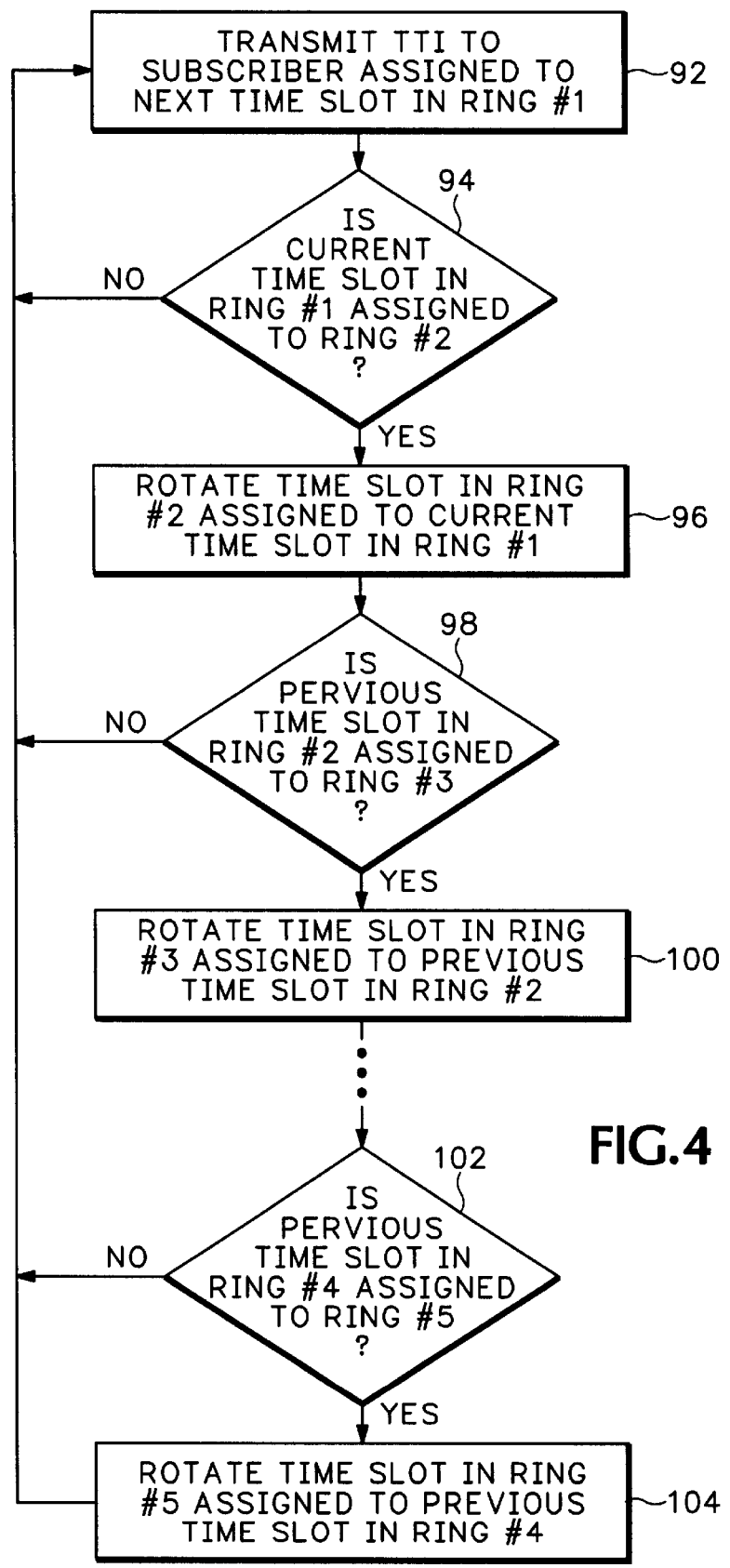
FIG. 4 is a flow chart showing how the Time Slotted Ring protocol rotates through time slots in multiple ring levels.

An example of a 5 level TSLR scheduler is shown in FIG. 4. A TTI is transmitted to the subscriber 22 assigned to the next time slot in ring #1 in step 92. When the current time slot is not assigned to ring #2, decision step 94 jumps back to step 92 to send a TTI to the subscriber assigned next time slot in ring #1. If the current time slot is assigned to ring #2, step 96 rotates the time slot in ring #2 assigned to the current time slot in ring #1.

Decision step 98 jumps back to step 92, transmitting a TTI to the subscriber 22 assigned to the next time slot in ring #1 when the previous time slot in ring #2 is not assigned to ring #3. If the previous time slot in ring #2 is assigned to ring #3 in decision step 98, step 100 rotates the time slot in ring #3 assigned to the previous time slot in ring #2. If decision step 102 determines the time slot for ring #4 is assigned to ring #5, step 104 rotates the time slot in ring #5 assigned to the previous time slot in ring #4. The number of logical rings is increased or decreased by reconfiguring the head end 18.

Multi-Level Scheduling

Figure 5:
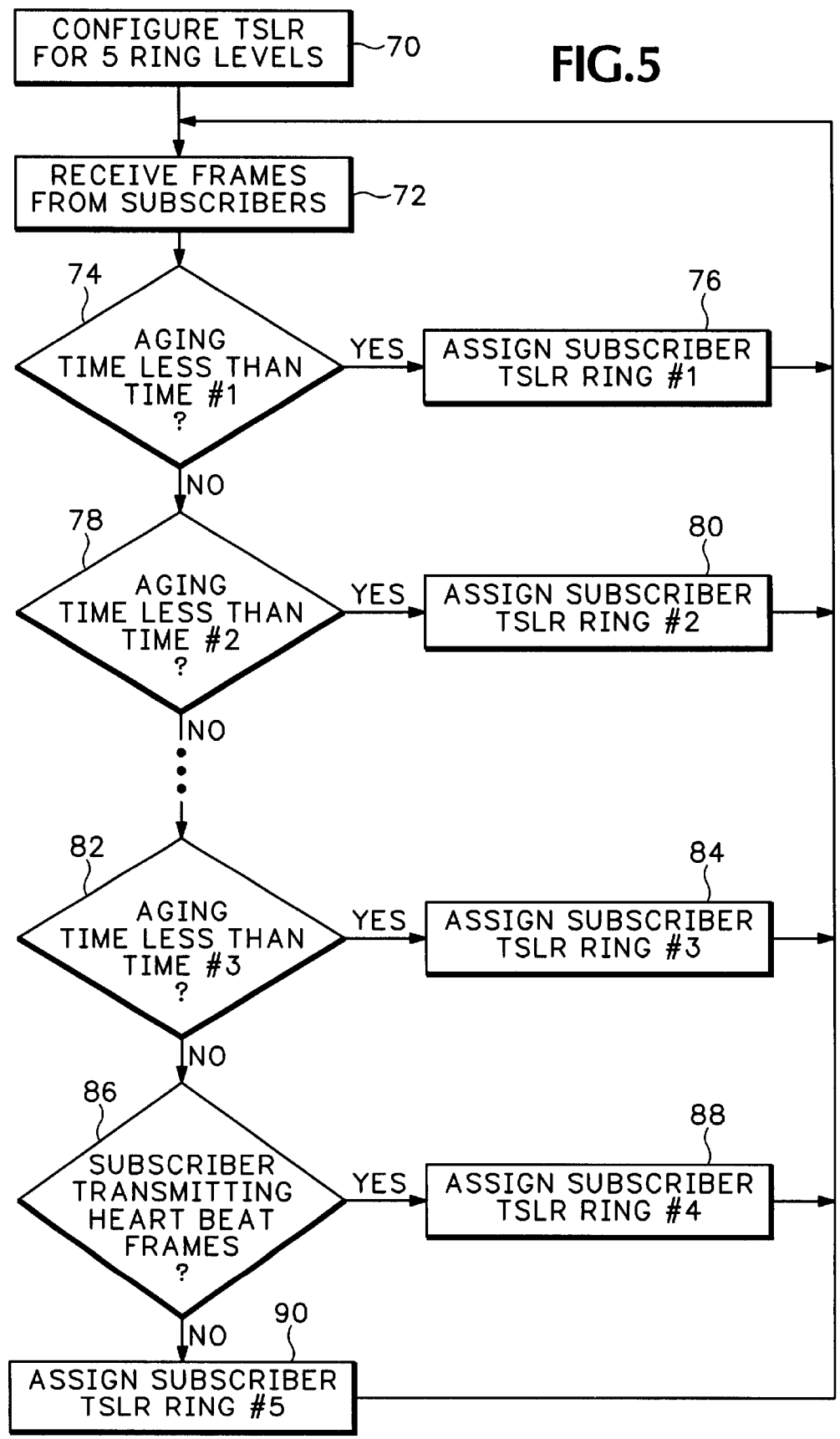
FIG. 5 is a flow chart showing one example of how users are assigned to different ring levels.

Referring to FIG. 5, the TSLR protocol is configured for 5 ring levels in block 70. Ring levels are dynamically assigned to subscribers 22 (FIG. 1) according to the frames received by the head end 18 in step 72. Any number of ring levels can be configured in the TSLR. Alternative systems of schemes can be used for promoting and demoting the subscribers to different ring levels as described in further detail below.

Level 1 is used for burst transfers, such as file transfers. Level 1 is assigned to the current active subscribers in step 76. The aging time on ring level 1 is less than a first time period, for example, some time period between 50 ms to 1 second, as determined in decision step 74. This keeps the top ring level small, so that the current subscribers are assured the maximum access to the upstream bandwidth when initiating file transfers. Level 2 is assigned to subscribers in step 80 who aren't currently sending data, but might at any moment. The aging time interval is somewhere between 5 minutes to 30 minutes as determined in decision step 78. The second aging time relates to subscribers who are currently inter-facing with a screen. The bulk of the active subscribers 22 would be in level 2.

Subscribers 22 who are less active, are assigned to ring level 3 in step 84. These subscribers have initiated a session with some far end host over the cable modem network 12, but get data infrequently, as they are working locally on their PC 52. (FIG. 2) An example application is a local PC 52 connected to the internet for mail access only. The aging time on level 3 is between 2 to 6 hours as determined in decision step 82 which represents an average session time.

Ring level 4 is assigned all other subscribers 22 in step 88 that are currently powered up but are inactive. Any subscriber 22 that is not on level 1, 2, or 3, but is issuing heart beat frames as detected in decision step 86 exist at level 4. Heart beat frames are described in further detail below. Ring level 5 represents the remaining subscribers that are powered down. Any subscriber 22 not transmitting a heart beat frame but is known to exist as assigned to level 5 in step 90.

The multi-level scheduling in TSLR achieves a balance between quick access time, and the bandwidth available to the subscriber 22 once he becomes an active user. The TSLR protocol achieves this objective by classifying the subscribers 22. Level 1 TSLR subscribers have the quickest access time and the largest percentage of network bandwidth available to them. Level 5 TSLR subscribers have the longest access time and the lowest percentage of the network bandwidth.

Different rules are used for promotion between rings. The simplest rule is that any subscriber 22 at any level that sends a frame gets immediate promotion to level 1. A more advanced rule set promotes a subscriber 22 up through the levels based upon his level of activity. For example, for each frame transmitted, a subscriber is promoted up one ring. Therefore, a new subscriber has to transmit four frames within a short time interval to be promoted all the way from level 5 to level 1.

Aging rules then demote the subscriber down to the appropriate level. In addition, subscribers which are limited in their interface rate may also be limited on how high up the level hierarchy they can go. For example, a 10 Mbps ethernet subscriber can be promoted all the way up to level 1 so that the total ethernet bandwidth can be used effectively. However, a 28.8 kbps subscriber is only allowed to be promoted as high as level 3 since level 3 meets the subscribers bandwidth requirements, and keeps the low bandwidth subscriber out of the way of high bandwidth subscribers.

TTI Metering

The amount of bandwidth a subscriber receives relates to how much the subscriber is willing to pay. A cable company can limit the bandwidth for particular subscribers so that "classes of service" may be established against a particular rate schedule. The TSLR protocol inherently control subscriber's bandwidth through the TTI issuing protocol. The bandwidth to any subscriber is limited by the number of TTI's issued within a given time frame. Essentially, TTI's are "metered" out to the subscriber.

The multi-level scheduling lowers access latency by increasing the user's priority based upon his network usage. The TTI metering protocol limits the total number of TTI's sent to the subscriber within a given time frame. In one implementation, a subscriber gets promoted up the logical ring structure as before, but once one of the TTI's is sent out, the subscriber remains at the current level and is passed over for another TTI until a fixed time between his TTI's is met. In a more complex implementation, a leaky bucket protocol is employed where the user is given a certain amount of time-bandwidth credits. As TTI's are issued, the credit count is decreased; as a configured time interval passes, the credit counter is increased. The credit count has a fixed maximum value. When the credit count hit zero, no more TTI's are issued until the particular time interval chosen had passed, and a credit was issued. The TSLR can also monitor the returned TTI's, and assign different weighting factors to used TTI's versus unused TTI's.

The leaky bucket protocol acts as a low pass filter. Short traffic bursts are allowed through at peak network bandwidth rates, but the overall average traffic is limited to a particular rate. The fixed TTI time interval limits both peak and average bandwidth, while the leaky bucket protocol limits more the average bandwidth and lets the peak bandwidth through. Since data tends to be very bursty, the leaky bucket protocol gives better performance to the subscriber at a lower class of service, while the fixed TTI time interval makes a subscriber more interested in increasing his class of service. Depending upon the class of service definition, either protocol may be employed.

TTI metering works in parallel with the hierarchy of logical rings. For example, if there is only one subscriber at level 1 who has an interface bandwidth of 100 kbps (either because of interface type or because of the class of service assigned), it would not make sense to give the level 1 subscriber every other TTI. Instead, other subscribers from level 2 and level 3 are allowed to use the idle time. This is done by assigning lower ring level subscriber more time slots on the level 1 ring.

Scheduling

Figure 6:
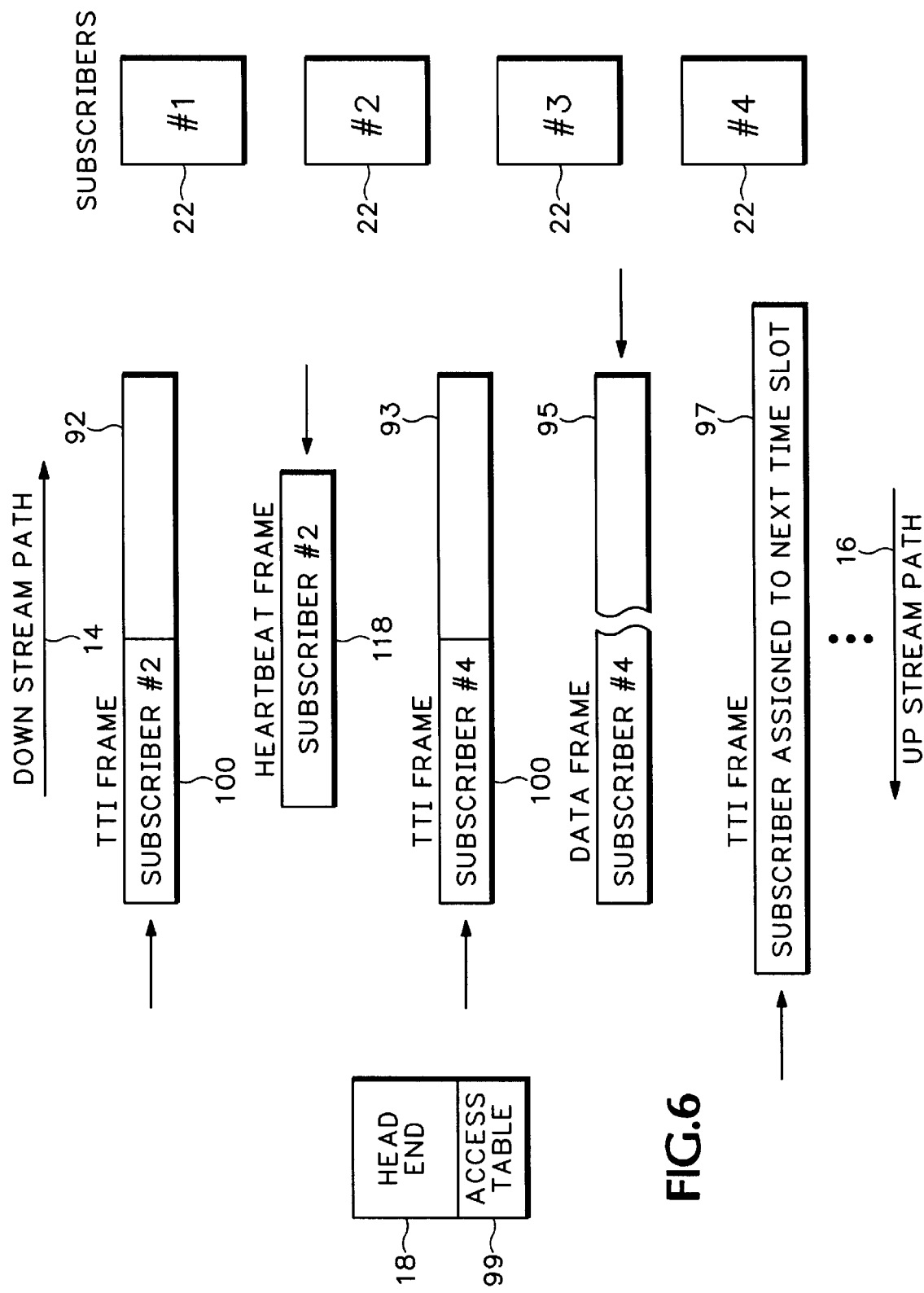
FIG. 6 is a diagram showing how frames are sent between a head end and subscribers in the cable modem network in FIG. 1.

Referring to FIG. 6, the downstream path 14 has one media with one transmitter at head end 18 and many receivers in subscribers 22. Since there is only one transmitter, the head end 18 always has access to the media 24 and 26 (FIG. 1). The head end 18 broadcasts data to cable modem receivers in all subscribers 22. Appended to the beginning of each frame 92 sent by the head end 18 is a subscriber identifier 100. When a subscriber 22 matches the subscriber identifier 100 in frame 92, the subscriber 22 receives the frame 92. Otherwise, the subscriber 22 discards the frame 92. All regular data traffic is directed in this manner towards individual subscribers 22. A series of subscriber identifiers 100 are reserved for broadcast/multicast use.

However, the downstream media must support the TSLR TTI's 92 for the upstream protocol. Since the downstream is a broadcast media with only one transmitter, there is no need to utilize the logical ring portion of TSLR on the downstream path 14. As frames are injected into the head end 18 by an external router or host 38 (FIG. 2), the frames 92 are set on a first come, first serve basis towards the subscribers 22. TTI metering is run in the downstream direction 14 at the head end 18 to prevent putting frames 92 onto the network that cannot be used, or to enforce a class of service. Since frames 92 are sent down back to back, packet aggregation is not required in the downstream direction. Early TTI release is also not applicable in the downstream since the frames are being sourced from the controlling end.

Early TTI Release

If the TSLR network is configured for large frames, and a subscriber 22 returns a small frame with a returned TTI, that returned TTI arrives at the head end 18 long before the next downstream TTI is scheduled to be sent out. The early TTI release option recognizes the returned TTI, and then issues a new time tick identifier frame in a queue.

This allows 1500 byte frames and 64 byte frames to be intermixed without a significant loss of bandwidth. The amount of time not recoverable is equal to the head end 18 to subscriber 22 round trip propagation delay plus the TTI turn-around time at the head end 18 and at the subscriber station 22 minus the packet transition time. A numerical example is provided below.

Early TTI release loses its effectiveness if a subscriber 22 does not return any frame and the head end 18 is forced to wait the full time tick period. The solution to this problem is to have subscribers 22 return heart beat frames 118 when they do not wish to send data. The heart beat frame 118 is a short frame that confirms the existence of the subscriber, and allows the TSLR early TTI release to move on to the next station. As a result, time ticks sent by the head end 18 are not evenly spaced in time, and subscriber modems do not make assumptions on the time tick arrival time.

Frame Aggregation

Smaller frames will lower the bandwidth efficiency considerably, unless several smaller frames are transmitted as a group within the time tick window. This is referred to as frame aggregation. The subscriber station 22 has knowledge of the maximum transmission window (time slot), and packs as many small frames into it as possible, followed by the returned data frame, such as data frame 95. This works well when there is a local queue of packets at a subscriber interface. This is not always the case for a casual subscriber who may be sending upstream keystrokes from his keyboard. However, in performance benchmark cases where large numbers of small packets are sent, frame aggregation significantly improves network performance. By performing the early TTI release and frame aggregation, network bandwidth efficiency is improved.

An "early TTI release" is a frame 118 that is returned by a subscriber 22 when it receives a TTI frame 92, but has no data to send upstream. This heart beat frame 118 allows the early TTI release protocol to issue the next TTI 93, rather than waiting for a maximum time-out interval. Instead of just being a null frame, the heart beat frame 118 contains basic information about the cable modem, such as the cable modem's subscriber identifier 100 (its serial number), its interface type (e.g., ethernet, Serial, T1), and its configured speed (e.g., 28.8 kbps, 10 Mbps). The subscriber identifier 100 in each TTI frame is used by the subscriber's cable modem to identify the TTI. The head end 18 is configured with an access table 99 of the permitted identification numbers allowed per network. The access table 99 gives the network some level of security because unauthorized cable modems would not be given permission to transmit, and would not be sent any directed downstream traffic.

When a cable modem for a new subscriber 22 is configured into the network, the head end 18 assigns the modem to a lowest TSLR ring (ring #5 in the example given in FIG. 5). When the subscriber 22 powers up the cable modem and begins transmitting heart beat frames 118, the head end 18 moves the subscriber to TSLR ring 4. If the heart beat frame 100 ever disappeared, the head end 18 times out while waiting for the returned heartbeat frame 118. The head end 18 then moves the subscriber 22 in question back to ring 5.

Heart beat frames 118 only consume a fraction of the network bandwidth under busy network conditions because subscribers sending heart beat frames 118 are not sending data and therefore are lower on the ring structure and have a long time between their TTI's. When a data frame is sent for example, data frame 95 in response to the TTI frame 93 from subscriber #4, the head end 18 waits a necessary amount of time before sending the next TTI frame 97 to the subscriber 22 assigned to the next time slot in the TLSR ring.

When none of the subscribers 22 have any data to transmit, the network is full of heart beat frames 118, allowing for quick diagnosis of any new network problems. The heart beat frames 118 can have an extended format which could contain an entire Management Information DataBase (MIB) for a simple network management protocol (SNMP) and network management use. For cable plant diagnostics, the head end 18 commands all cable modems in all subscribers 22 to begin transmitting heart beat frames 118 at the subscriber's configured maximum transfer unit (MTU). With all modems transmitting maximum size frames on upstream path 16, the head end 18 checks the guard band between all frames as they arrive at the head end 18 to make sure there is no overlap between subscriber modems that might be contributing to network data corruption.

Even for normal traffic, the head end 18 keeps statistics on the dead time between frames to make sure it is sufficient to prevent frame overlap, but not excessive to cause loss of service bandwidth. The minimum inter-frame gap will be a configuration parameter of the head end 18 and is related to the geographical size of the local node 20. By using the heart beat frames 118 set to their maximum MTU size, this parameter is measured and auto-configured by the head end 18.

TSLR MAC Layer Framing

Figure 7:
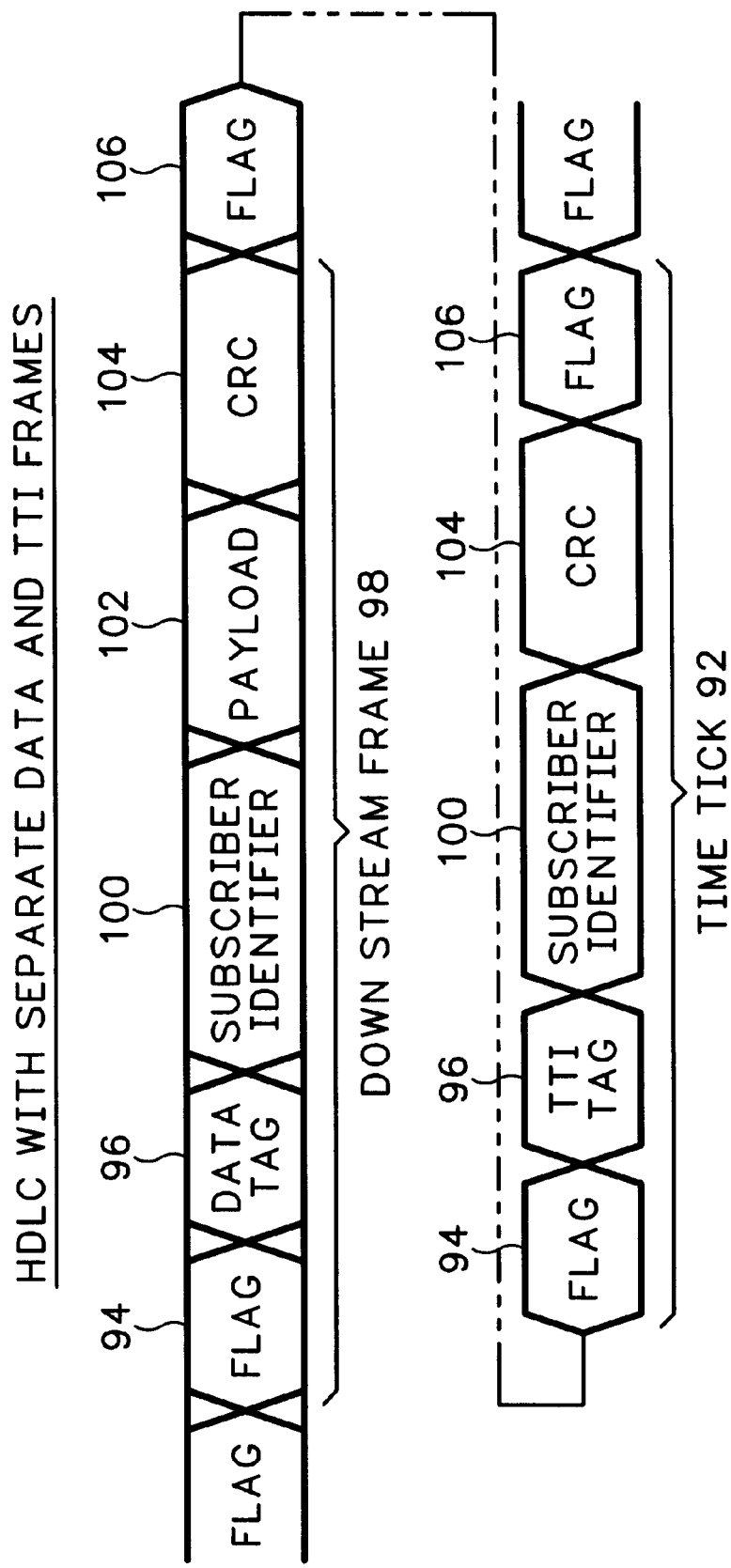
FIG. 7 is a diagram showing a downstream frame structure used in the Time Slotted Ring protocol.

Referring to FIGS. 7–9, one embodiment of the invention includes the TSLR MAC framing mechanism located in MAC's 34 and 45 and are independent of the TSLR MAC link management entity. Other framing methods can also be implemented. The TSLR framing layer provides the following services:

1. Frame demarcation downstream and upstream.

Method of inserting unique time tick identifiers and tags in the downstream path at arbitrary intervals for use with upstream traffic control.

An error checking code.

The ability to have frames back-to-back in the downstream direction with minimum overhead.

Reduction of overhead on upstream frames.

The ability to identify individual nodes.

In one embodiment, TSLR uses a variant of high level data link control (HDLC) for MAC layer framing. However, any interface can be used in combination with the invention. HDLC framing is an international specification that has been in use for years as an IOS Layer 2 framing protocol on wide area network connections such as X.25, frame relay and PPP. HDLC provides the basic functions of frame demarcation and error detection, while maintaining low overhead and back-to-back frame performance. In the downstream direction, TSLR uses a variant of HDLC called pre-emptive HDLC to allow TTI's to be arbitrarily embedded in the data stream. Pre-emptive HDLC allows a TTI frame to be inserted at any bit boundary between or within a data frame. In the upstream direction, standard HDLC is used with provisions for idle mark, flag preamble if needed, and packet aggregation. The payload of the TSLR MAC layer is independent of the MAC layer and could be PPP, encapsulated ethernet frames, ATM or voice.

Downstream Framing

FIG. 7 shows the HDLC format used to frame the data frames in the downstream direction. TTI's, which are also in the downstream, are HDLC frames with a different tag. The structure of a data frame 98 for downstream TSLR HDLC framing begins with an opening flag 94 or 01111110. The uniqueness of this 8 bit pattern is guaranteed by adding (stuffing) and subsequently removing (stripping) a zero after any sequence of five ones. The first byte after the flag is a tag byte 96. A tag 96 identifies the packet as a data frame 98 or as a TTI frame 92. Additional functions of the tag 96 are discussed in further detail below. The tag 96 is the first byte after the flag 94 to allow immediate frame filtering and classification by hardware steering logic.

A subscriber identifier 100 is usually the manufacturer's serial number of the cable modem. The subscriber identifier 100 identifies which cable modem should receive the frame 98. A traditional address and control field of HDLC is replaced by the tag 96 and the subscriber identifier 100. A payload 102 of the frame 98 is the data packet (such as a PPP packet) being moved across the network. It is followed by a cyclic redundancy code (CRC) 104 to guarantee maximum data integrity and a closing flag 106. The downstream idle character is a repeating flag sequence. The edges in the idle flags allow downstream phase locked loops (PLLs) to remain locked. Frames 92 and 98 may be aborted by the transmitter by inserting six or more ones within a data frame. Opening and closing flags may be shared.

The TTI frame 92 begins with an opening flag 94. The tag 96 identifies the frame as a TTI frame. The subscriber identifier 100 contains the ID of the subscriber 22 who is next allowed to transmit upstream. There is no payload. The TTI frame 92 ends with a CRC 104 and a closing flag 106.

Referring to FIG. 8, the TTI frame 92 is inserted beginning at any bit position in the downstream data path (pre-emptive HDLC). If a data frame 98 is being received and a single flag 94 occurs, the receiver checks the tag 96 to determine whether the flag 94 is a closing flag for the current frame 98, or is an opening flag for the TTI frame 92. If two flags occur in sequence, it is assumed that the first flag was a closing flag for the previous frame. The bit stuffing and stripping calculations for two interlaced packets are kept separate. In this manner, steering logic can intercept the TTI frames 92 and route them away from a data HDLC controller and into a second HDLC controller.

Upstream Framing

Referring to FIG. 9, the upstream data path 16 (FIG. 1) represents a many to one mapping, and therefore, naturally tends to have contentions. The downstream TTI frames 92, however, institute an orderly environment where only one subscriber will transmit at a time, thus eliminating contention. Initial response times and latencies are dealt with within the TSLR MAC layer link management entity running at the head end 18.

The upstream TSLR framing uses a standard, non pre-emptive, HDLC format. An idle mark 116 is used between frames 118. Idle mark 116 refers to an idle pattern of all ones. This means the media can default to a logic high when there are no subscriber nodes transmitting, and all receivers will perceive this as idle. When the particular subscriber 22 receives a TTI frame 92, the frame 118 is launched. The frame 118 could be data frame, a heart beat Frame, or a frame aggregation frame. The differentiation is made by the tag 96. The subscriber identifier 100 is the source id of the frame 116, and is therefore, the same id sent in the TTI frame 92. The payload 102 is null if the packet is a heart beat frame without any extended information or a data packet from the attached network. The payload 102 is followed by a CRC 104. The tag 96 is different between a TTI frame and a heart beat frame, so the CRC 104 will have to be recalculated. The frame 118 ends with a closing flag 106.

If frame aggregation was indicated in the tag 96, another frame immediately follows. Idle marks 116 are not allowed between frame aggregation frames, but multiple flags are permitted so long as the total number of bytes in the entire multi-frame sequence does not exceed the frame aggregation maximum transfer unit (FA-MTU) allowed by the head end TSLR. Once the data transmission is finished, the subscriber transmitter releases the media, and the media defaults to all ones. The length of idle depends upon the TSLR protocol configuration values being used at the head end 18.

Tag Byte

The tag byte 96 includes bit definitions listed below and further described in FIG. 11. Direction Bit: This bit identifies the packet as an upstream or downstream packet. This bit is used with the ID bit, and is also useful for network diagnostics. Identification Bit: This bit identifies a data packet, a downstream packet as a TTI, and an upstream packet an a heart beat packet. Frame Aggregation Bit: Used in the upstream direction to identify a single frame is being sent, whether another frame will be sent immediately following the current frame. Expansion Bit: This bit identifies a simple TTI or a simple heart beat and whether there is a payload.

TSLR Physical Layer Requirements

The physical layer of the cable media provides the following services: downstream data link, upstream data link, and a synchronized clock and data interface at both ends of the link. As the data passes through the interface at either end of the TSLR network 12 shown in FIG. 1, there must be a separate clock signal and a separate data signal. On the TSLR internal media 24 and 26, clock and data are typically combined together. This leads to the requirement of a clock recovery circuit at each end of the TSLR media.

In the downstream direction 14, all bits are generated off of one master clock at the head end 18, so each subscriber node 20 can synchronize with a PLL to the master clock. The downstream idle character contains edge information, so a lock will always be maintained. This is true even though each subscriber 22 is located at a different distance from the head end 18. In the upstream direction 16, clocking is more difficult. Since each subscriber 22 is a different distance from the head end 18, frames arriving at the head end 18 will all be at the same frequency, but at different clock phases. This is assuming that the subscribers 22 are using the downstream clock to generate the upstream clock. If the upstream clock is free-running, then the problem is even more difficult.

TSLR provides two solutions for upstream clock recovery. The first solution attaches a preamble of bits to the beginning of the frame to provide time for a phase locked loop to lock on. This preamble is in the upstream direction only and is a sequence of HDLC flags. Most HDLC controllers have the ability to send a minimum number of frames between flags. External gating of the HDLC controller provides the all ones idle. The second solution uses the head end master clock as a frequency reference, (assuming accurate PPL in the network), digitally over samples the incoming signal, mathematically determines its phase, and then extract the data. Phase and frequency shifts during a maximum length packet are limited to a fraction of the clock cycle, depending upon the oversampling ability.

TSLR Cable Modem Hardware Block Diagram

Figure 10:
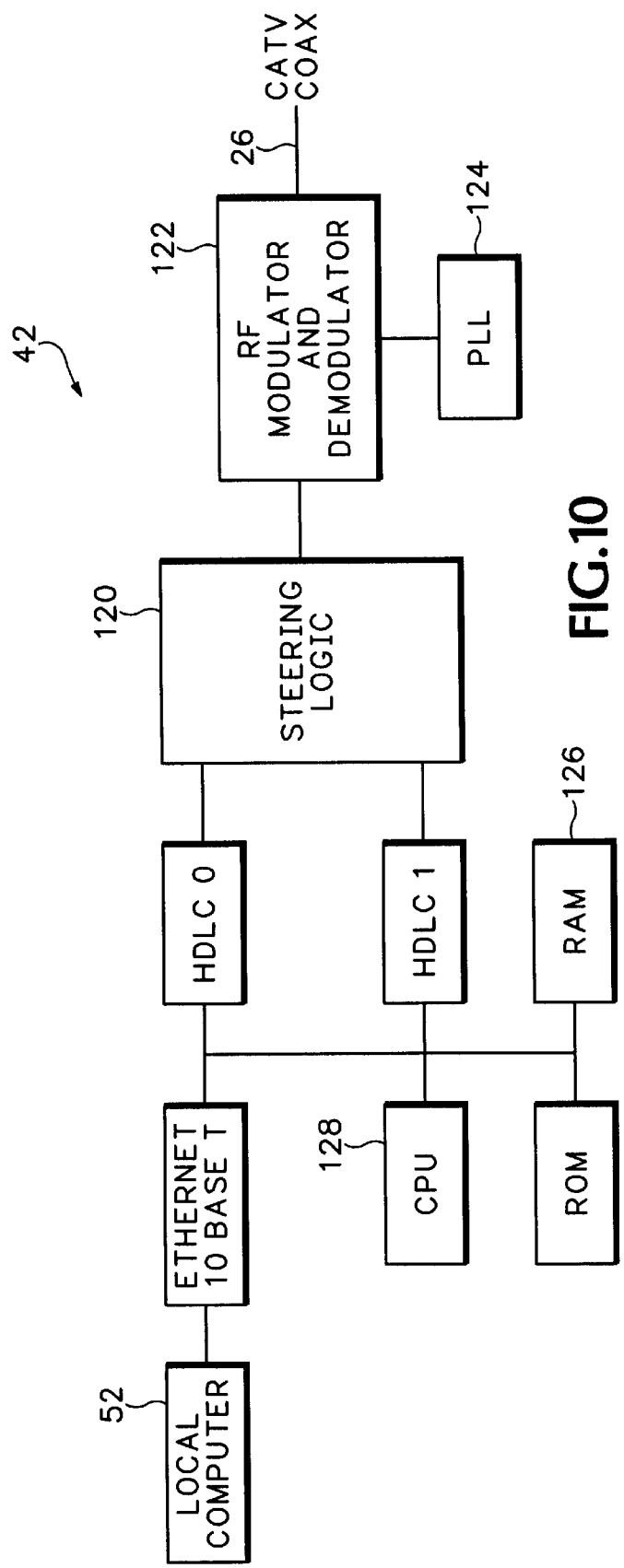
FIG. 10 is detailed block diagram of a cable modem using the Time Slotted Ring protocol.

A high level block diagram of a TSLR cable modem is given in FIG. 10. The RF demodulator 122 extracts from the CATV coax 26 raw data from the RF spectrum and physically formats it into a clock stream and a data stream with a PLL 124. The RF modulator 122 does the opposite function of taking base band clock and data streams and up converting them into a RF spectrum transmitted on the coax 26. On receive, steering logic 120 checks the tag byte 96 and separates out TTI frames 92 from data frames 98 (FIG. 7). On transmit, the steering logic 120 enables one of the HDLC controllers HDLC0 or HDLC1 to send data, if there is data queued up, or a heart beat frame 118 if no data is queued up. After the packet transmission, the steering logic 120 disconnects the HDLC 0 or HDLC 1 and returns the line to mark idle.

All the data traffic goes through HDLC 0. HDLC 0 direct memory accesses (DMA's) data frames from the line into RAM 126, and from RAM 126 back to the line. All TTI's and heart beat frames go through HDLC 1. Since non-extended TTI's and heart beats (refer to tag byte values) do not need intervention from CPU 128, HDLC 1 can be simpler in design than HDLC 0. The CPU 128 provides the local switching function that prevents local frames between local computers 52 (FIG. 2) from getting into the cable modem network 12. CPU 128 also manages a local queue of packets that are waiting for TTI's, frame aggregation, and local diagnostics.

For a network bandwidth of 30 Mbps downstream and 10 Mbps upstream. The minimum length between TTI's is:

| | |
|---|---|
| 1 us | head end response time |
| 3.2 us | TTI downstream transition time |
| 14 us | delay in local node network |
| 1 us | subscriber turnaround time |
| 11.2 | heart beat upstream transition time |
| 5 us | guard band |
| 35.4 us | Total |

The maximum time between TTI's with a 1,500 byte frame instead of a heart beat frame: 35.4 us–11.2 us+1,200 us=1, 224 us. The minimum length of time between time tick frames in this example is affected only by the first three items, and is about 25 microseconds plus the frame transition time. Without the TSLR "pipe-lining" effect of having multiple TTI's issued, the minimum length of time between time ticks is 145 microseconds plus the frame transition time. The frame transmission time for a long frame is many times greater than the local propagation delay. That means that almost all the upstream bandwidth can be used for data transmission, and that the maximum data transmission rate will approach 100% efficiency.

The Time Slotted Logical Ring protocol manages the flow of traffic in a duplex media. This duplex media has a local area to it which is tree structured, and a remote controlling processor which is connected with a long haul link. The specific implementation is a cable distribution network with a head end, a local node, and a group of subscribers.

The subscriber node includes a cable modem which produces an HDLC serial interface which then goes to the subscriber or gets converted to ethernet by a router and then to the subscriber. Conversions to ISDN, ATM, or other interfaces can also be done, depending upon the payload data type. The Time Slot portion of TSLR protocol manages upstream and downstream access and uses time ticks, tags, and TTI's in the downstream direction to control upstream traffic. The frame aggregation and early TTI release algorithms improve bandwidth performance for short frames.

The logical ring portion of TSLR manages upstream bandwidth and access time by classifying subscribers into hierarchical levels based upon their network usage. Subscribers who are actively using the network are given shorter access times and high bandwidths by a system of ring promotion and demotion. The Lower Ring Access Interval controls how much of the active bandwidth is used to survey non-active users. Downstream bandwidth management does not use the ring hierarchy. Instead, frames are sent on a first come, first serve basis from the head end. TTI metering is used to make sure that excessive TTI's are not wasted on a lower bandwidth subscriber, and also to provide a means for defining classes of service.

Because TSLR minimizes interframe gaps for any size frame and dynamically allocates more bandwidth to busier users, TSLR could support wire speed ethernet rates simultaneously from different subscriber nodes up to the physical bandwidth of the network media. The TSLR protocol is highly efficient over a large geographically distributed media, and is extendable to data, voice, ATM, or any mixture, and is usable to back end a variety of physical layer interfaces such as ethernet, ISDN, ATM, or serial.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method for controlling communications between a head end and multiple subscribers on a broadcast media, comprising:

broadcasting data from the head end to the subscribers over a downstream path of the broadcast media;

allocating bandwidth for an upstream path of the broadcast media between time slots on different ring levels;

assigning different percentages of the upstream bandwidth to each of the different ring levels so that each subsequently lower ring level is allocated a portion of the bandwidth assigned to an immediately preceding one of the ring levels;

assigning the subscribers to the time slots on the different ring levels according to the bandwidth requirements of the subscribers; and rotating selection of the time slots around the multiple ring levels and enabling transmission for the subscribers assigned to the selected time slots on the multiple ring levels.

2. A method according to claim 1 wherein one of the multiple ring levels provides a constant bit rate for burst transmissions.

3. A method according to claim 1 wherein one of the multiple ring levels is a highest level for multiple lower levels that all have a variable bit rate.

4. A method according to claim 1 wherein a lowest one of the ring levels is assigned to the subscribers that are inactive.

5. A method according to claim 1 wherein one of the ring levels is assigned to the subscribers that are active but not transmitting data.

6. A method according to claim 1 wherein one of the ring levels is assigned to the subscribers that are currently transmitting data at a low bit rate.

7. A method according to claim 1 wherein one of the ring levels is assigned to the subscribers that are currently transmitting data at a high bit rate.

8. A method for controlling communications between a head end and multiple subscribers on a broadcast media, comprising:

allocating bandwidth for an upstream path of the broadcast media between time slots on multiple ring levels and assigning the time slots on the multiple ring levels to the subscribers;

allocating the bandwidth for one or more of the time slots on a first one of the multiple ring levels between the time slots on one or more of the multiple ring levels lower than the first ring level;

rotating selection of the time slots around the first ring level and enabling transmission for the subscribers assigned to the selected time slots on the first ring level; and rotating selection to a next one of the time slots on the lower ring levels when the selected time slot on the first ring level is allocated to the lower ring levels and enabling transmission for the subscriber assigned to the selected one of the time slots on the lower ring levels.

9. A method according to claim 8 including assigning the subscribers to the different ring levels according to a number of data frames sent by the subscribers during different aging times.

10. A method according to claim 9 including assigning longer aging times to each lower ring level.

11. A method according to claim 8 wherein the head end sends time tick identifier frames on the broadcast media to the subscribers assigned to the selected time slots that enable the subscribers to transmit upstream frames back to the head end during assigned time slots.

12. A method according to claim 11 wherein the subscribers transmit heart beat frames to the head end after receiving time tick identifier frames when the subscribers are not transmitting a data frame or transmitting a reduced sized data frame.

13. A method according to claim 12 wherein the head end assigns the subscribers sending heart beat frames to higher ring levels than powered down subscribers.

14. A method according to claim 12 wherein the head end releases an early time tick identifier frame to one of the subscribers assigned to the next selected time slot after receiving a heart beat frame.

15. A method according to claim 11 including aggregating multiple data frames from the same one of the subscribers together and sending the aggregated frame to the head end.

16. A method according to claim 11 including assigning the subscribers to classes and metering out a maximum number of time tick frame frames sent to the individual subscribers in a fixed time periods according to assigned subscriber classes.

17. A method according to claim 11 including the following:
    assigning each one of the subscribers time-bandwidth credits;
    decreasing the credits for the subscribers receiving time tick identifier frames;
    discontinuing sending time tick identifier frames to the subscribers with no credits; and
    increasing the credits for the subscribers after a selected time interval.

18. A method according to claim 8 including limiting the highest ring level assigned to individual subscribers according to a maximum transmission rate of the individual subscribers.

19. A method according to claim 8 including assigning selected subscribers to a zero ring level that preempts all other ring levels, the zero ring level initiated and sequenced once every predetermined time period.

20. A method according to claim 19 wherein the subscribers are assigned to the zero ring level when sending voice data.

21. A cable network, comprising:
    a head end coupled to a broadcast media;
    multiple subscribers receiving downstream frames from the head end and transmitting upstream frames to the head end on the broadcast media; and
    a time slotted logical ring controller scheduling transmission of upstream frames from the subscribers by sending time tick identifier frames to the subscribers according to subscriber assigned time slots on multiple ring levels, each one of the multiple ring levels allocating a portion of upstream bandwidth to lower ring levels by assigning a number of time slots to a next lower ring level.

22. A cable network according to claim 21 wherein the head end comprises a cable broadcast station.

23. A cable network according to claim 21 including a local node coupled between a group of the multiple subscribers and the head end, the broadcast media between the head end and the local node comprising a long haul fiber optic link and the broadcast media between the local node and the group of subscribers comprising a coaxial cable.

24. A cable network according to claim 21 wherein the head end comprises the following:
    an RF modulator coupled to the broadcast media;
    a medium access controller coupled to the RF modulator including the Time Slotted Logical Ring controller; and
    a router coupled between the medium access controller and an internetwork or intranet work.

25. A cable network according to claim 21 wherein each subscriber includes the following:
    a cable modem;
    a medium access controller coupled to the cable modem performing a time slotted logical ring protocol; and
    a router coupled between the medium access controller and a personal computer.

26. A cable network protocol for controlling traffic between a broadcast station and multiple subscribers on a broadcast media, comprising:
    the broadcast station sending downstream frames on the broadcast media, the downstream frames including the following;
    a flag identifying the beginning and end of the downstream frames,
    a tag identifying the downstream frames as data frames or time tick identifier frames, the time tick identifier frames used for scheduling upstream traffic from the multiple subscribers to the broadcast station over the broadcast media, and
    a subscriber identifier identifying one or more of the multiple subscribers for receiving the downstream frames, the subscribers when identified for receiving one of the time tick identifier frames transmitting an upstream frame back to the broadcast station.

27. A cable network protocol according to claim 26 wherein the data frames are preempted by time tick identifier frames by inserting a flag at any bit position in the data frames and then following the flag with a tag identifying the flag as a closing flag for the current frame or an opening flag for the time tick identifier frame.

28. A cable network protocol according to claim 26 wherein the broadcast station comprises a cable TV station, the broadcast media comprises a cable TV communication link and the downstream frames are formatted, sent and received by cable modems.

29. A cable network protocol according to claim 26 wherein the upstream frame includes the following:
    a flag identifying the beginning and end of the upstream frames,
    a tag identifying the upstream frames as data frames, heart beat frames indicating no data is being sent by the subscribers or an aggregation frame indicating multiple data packets are aggregated by the subscribers into the same upstream frame, and
    a subscriber identifier identifying the subscribers transmitting the upstream frame.

30. A cable network protocol according to claim 26 wherein a rate at which time tick identifier frames are sent to the multiple subscribers varies according to how often the subscribers transmit upstream data frames to the broadcast station.

31. A system for controlling communications between a head end and multiple subscribers on a broadcast media, comprising:
    means for allocating bandwidth for an upstream path of the broadcast media between time slots on different ring levels;

means for assigning different percentages of the upstream bandwidth to each of the different ring levels so that each subsequently lower ring level is allocated a portion of the bandwidth assigned to an preceding one of the ring levels;

means for assigning the subscribers to the time slots on the different ring levels according to the bandwidth requirements of the subscribers; and means for rotating selection of the time slots around the multiple ring levels and enabling transmission for the subscribers assigned to the selected time slots on the multiple ring levels.

32. A system according to claim 31 including means for providing a constant bit rate for burst transmissions for at least one of the multiple ring levels.

33. A system according to claim 31 including means for assigning one of the multiple ring levels as a highest level for multiple lower levels that all have a variable bit rate.

34. A system according to claim 31 including means for assigning a lowest one of the ring levels to the subscribers that are inactive.

35. A system according to claim 31 including means for assigning one of the ring levels to subscribers that are active but not transmitting data.

36. A system according to claim 31 including means for assigning one of the ring levels to the subscribers that are currently transmitting data at a low bit rate.

37. A system according to claim 31 including means for assigning one of the ring levels to subscribers that are currently transmitting data at a high bit rate.

38. A cable device, comprising:

a controller scheduling transmission of upstream frames according to time slots assigned to multiple ring levels, the controller allocating upstream bandwidth to the multiple ring levels and allocating a portion of the bandwidth allocated to a first one of the multiple ring levels to a lower one of the ring levels by assigning one or more of the time slots in the first one of the multiple ring levels to the time slots in the lower one of the ring levels.

39. A cable device according to claim 38 wherein the controller is located in a cable network head end.

40. A cable device according to claim 39 wherein the upstream frames are transmitted from multiple cable subscribers to the cable network head end over a broadcast media that includes a fiber optic link and a coaxial cable.

41. A cable device according to claim 40 wherein the head end includes a modulator coupled to the broadcast media and a router coupled between the controller and a packet switched network.

42. A cable modem, comprising:

a processor transmitting data over an upstream path of a cable medium according to time slots assigned over multiple ring levels, at least one of the multiple ring levels allocating a portion of its assigned bandwidth on the upstream path to a lower one of the multiple ring levels by assigning a number of its time slots to the lower one of the multiple ring levels.

43. A cable modem according to claim 42 wherein the processor receives assignment to the multiple ring levels according to a number of data frames the processor sends during different aging times.

44. A cable modem according to claim 42 wherein the processor receives time tick identifier frames that enable the processor to transmit data in the upstream path during its assigned time slots.

45. A cable modem according to claim 42 wherein the processor transmits heart beat frames after receiving time tick identifier frames when the processor is not transmitting data.

46. A cable modem according to claim 45 wherein the processor is assigned a first one of the ring levels when sending heart beat frames and is assigned a lower one of the ring levels when powered down.

47. A cable modem according to claim 42 wherein the processor aggregates multiple frames of data together and sends the aggregated frames over the upstream path.

48. A cable modem according to claim 42 wherein the processor receives a highest ring level that preempts all other ring levels when sending voice data.

* * * * *